United States Patent
Nguyen

[11] Patent Number: 6,073,358
[45] Date of Patent: Jun. 13, 2000

[54] ARRANGEMENT AND METHOD FOR MEASURING A DISTANCE

[75] Inventor: Uy-Liem Nguyen, Baden-Dättwil, Switzerland

[73] Assignee: ABB Alstom Power (Switzerland) Ltd., Baden, Switzerland

[21] Appl. No.: 09/064,006

[22] Filed: Apr. 21, 1998

[30] Foreign Application Priority Data

Apr. 26, 1997 [DE] Germany .......................... 197 17 816

[51] Int. Cl.[7] .......................... G01B 21/16; G01D 21/00
[52] U.S. Cl. .................................. 33/710; 33/613
[58] Field of Search ............... 33/710, 501.02, 33/613, 626, 645; 116/230, 280

[56] References Cited

U.S. PATENT DOCUMENTS

| | | | |
|---|---|---|---|
| 4,207,564 | 6/1980 | Isakson et al. | 116/280 |
| 4,548,105 | 10/1985 | Koutonen | 33/710 |
| 4,914,829 | 4/1990 | Keaton | 33/613 |
| 5,171,584 | 12/1992 | Ramsey et al. | 33/710 |

*Primary Examiner*—Christopher W. Fulton
*Assistant Examiner*—Quyen Doan
*Attorney, Agent, or Firm*—Oblon, Spivak, McClelland, Maier & Neuatadt, P.C.

[57] ABSTRACT

An arrangement and method for measuring a distance between rotating and stationary parts of a device, such as a turbine. The arrangement and method allow for the measurement of a distance between the tip of the rotating bodies arranged on a rotor of the turbine, and the inside of a casing that encloses the rotor. The arrangement and method provide for at least one abrasion-tolerant layer of a specified thickness arranged on the inside of the casing opposite the tip of the rotating body at a specified thickness. The at least one abrasion-tolerant layer includes at least one indicator that can be detected in the exhaust gas of the turbine, thereby providing indication of abrasion between the tip of the rotating body and the abrasion-tolerant layer.

20 Claims, 2 Drawing Sheets

6,073,358

ARRANGEMENT AND METHOD FOR MEASURING A DISTANCE

TECHNICAL FIELD

The invention relates to an arrangement for measuring a distance between rotating and stationary parts of a turbine according to the preamble of the first claim.

It likewise relates to a method of measuring a distance between rotating and stationary parts of a turbine according to the preamble of the independent method claim.

PRIOR ART

DE 35 34 641 A1 discloses a coating for high-temperature turbine seals. This coating, facing the blade-body tip, is applied to the inside of the casing by thermal spraying and may comprise a plurality of layers. The coating is designed in such a way that the blade-body tip touching the coating on the inside of the casing is not damaged, i.e. the coating has a lower degree of hardness than that of the blade-body tip. This abrasion-tolerant coating is intended to keep the gap between blade-body tip and casing as small as possible without there being the risk of the blade becoming damaged.

However, a check as to whether the blade-body tip is touching the coating and as to which layers of the coating are being abraded is only possible if the turbine is shut down and the casing opened.

DESCRIPTION OF THE INVENTION

The object of the invention, in the case of an arrangement for and a method of measuring a distance between rotating and stationary parts of a turbine of the type mentioned at the beginning, is to permit a measurement of the distance between the rotating part and the inside of the casing of the turbine during operation, in particular during the start-up of the turbine.

According to the invention, this is achieved by the features of the first claim.

The essence of the invention, therefore, is that at least one indicator is embedded in the abrasion-tolerant layer which is abradable by a rotating part. The indicator, abraded together with the abrasion-tolerant layer, is transported in the fluid flow of the turbine, and can be detected by a detector at the turbine outlet. This allows a judgement and measurement to be made of the gap between rotating and stationary parts.

The advantages of the invention may be seen, inter alia, in the fact that, by means of the indicator and a detector and analyzer, it can be established when and where the tip of the rotating body is touching the inside of the casing.

It is especially expedient if different indicators are arranged in various layers following one another in the direction of flow. Various regions of the turbine can thereby be checked with the detector and analyzer. The distance between the tip of the rotating body and the stationary casing can be determined exactly by the application of a plurality of layers which lie one above the other in radial direction and have different indicators.

Further advantageous developments of the invention follow from the subclaims.

BRIEF DESCRIPTION OF THE DRAWING

An exemplary embodiment of the invention is shown in the drawings, in which.

Only the elements essential for understanding the invention are shown.

WAYS OF IMPLEMENTING THE INVENTION

Figure 1:
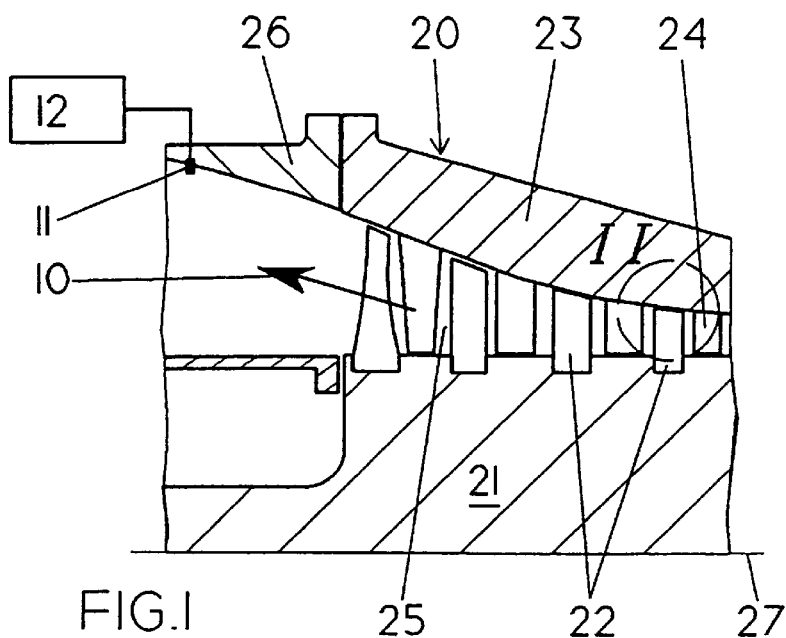
FIG. 1 shows a partial longitudinal section through a turbine.

According to FIG. 1, a turbine 20 mainly comprises a rotor 21, which is fitted with moving blades 22, and a turbine casing 23, in which guide blades 24 are attached in position. The casing 23 and the rotor 21 form an essentially annular duct 25, through which a high-energy gaseous medium 10 is directed. The energy of the medium directed through the duct 25 is given off to the moving blades 22, as a result of which the rotor 21 starts to rotate about its rotation axis 27. The energy of the gaseous medium is therefore converted into rotary energy, which can be given off, for example, to a generator (not shown). The expanded gaseous medium 10 is drawn off via an exhaust-gas casing 26, which is flange-mounted on the casing 23. Arranged in the exhaust-gas casing 26 is a detector 11, which is connected to an analyzer 12.

Figure 2:
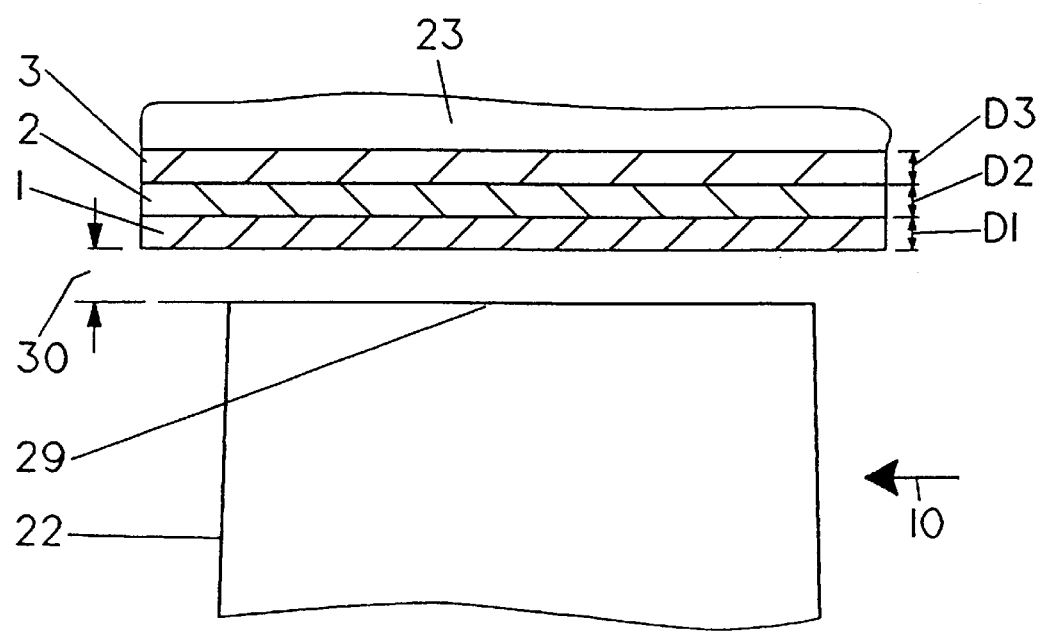
FIG. 2 shows an enlarged detail of FIG. 1.

According to FIG. 2, a coating having a plurality of layers 1, 2 and 3 with a layer thickness D1, D2 and D3 is arranged on the inside of the casing 23. The layers are made of a parent material whose hardness is less than that of the blade-body tip. The layers 1, 2 and 3 have a chemical composition which is altered in each case. This varying composition is provided at least by specific indicators, i.e. chemical compounds, which are embedded in the parent material of the layers. The layers 1, 2 and 3 may therefore have the same parent material but have different indicators added to them.

Figure 3:
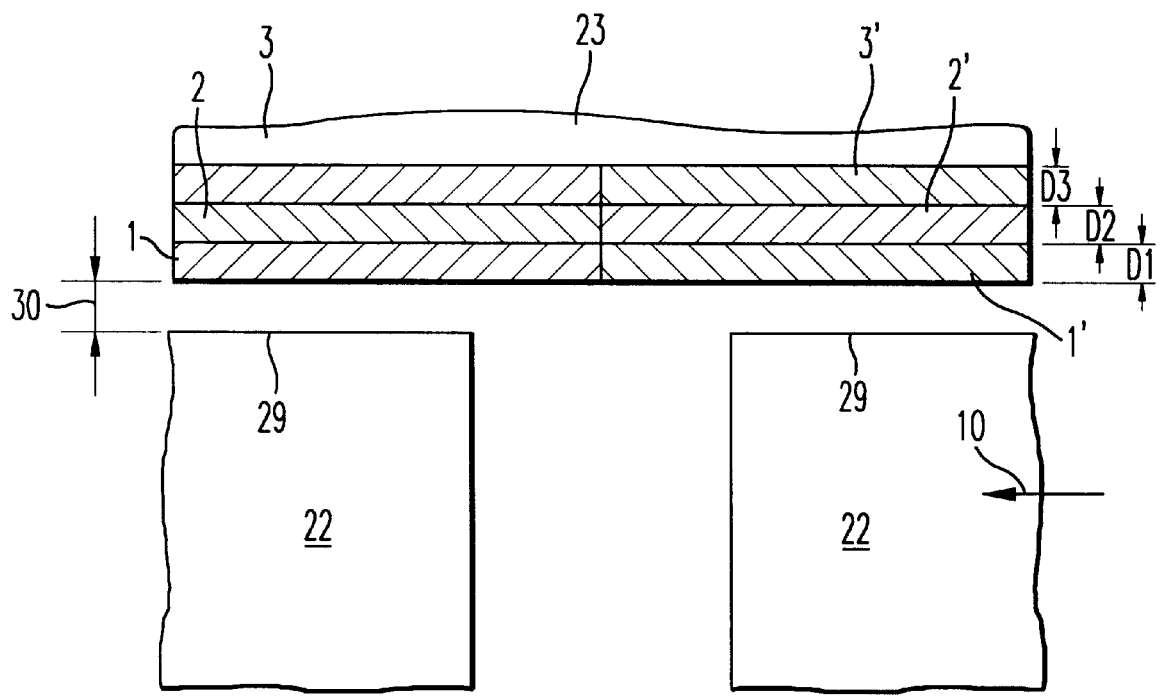
FIG. 3 shows an enlarged detailed of a second embodiment of FIG. 1.

The moving blade 22 or its associated blade-body tip 29 is arranged at a gap distance 30 from the first layer. During operation of the turbine 20, in particular in the transients, the blade heats up and the distance 30 becomes smaller until the blade tip touches and abrades the first layer 1. The abrasion particles are transported in the direction of flow of the gaseous medium. The composition of the gases and particles issuing from the turbine can be analyzed by means of a detector (shown in FIG. 1) on the exhaust-gas casing and by means of an analyzer 12 connected to the detector. The particular layer being abraded can be determined by the measurement and detection of the different indicators. The indicators may be varied from blade row to blade row, as a result of which it can be determined exactly which blade row is abrading which layer at which point in time (see, for example, the embodiment depited in FIG. 2); and According to FIG. 3, a coating having a plurality of layers 1, 1', 2, 2', 3, and 3' are arranged on the inside of the casing 23. Each of the layers is provided with indicators, which are preferably, but necessarily, distinct from one another. Note that in this configuration, layers 1, 2, and 3 are arranged opposite a moving blade 22 and layers 1', 2', and 3' are arranged opposite an adjacent moving blade 22, thereby providing for separate analysis of the individual blades. The layers are arranged both in the direction of fluid flow within the casing 23 (for example, layers 1 and 1', layers 2 and 2', and layers 3 and 3'), and in successive radial directions (for example, layers 1, 2, and 3, and layers 1', 2', and 3'). Various modifications of this embodiment are contemplated by this invention, and will be readily apparent to one of skill in the art.

The invention is of course not restricted to the exemplary embodiment shown and described. It may be used in the case of all movable parts in order to measure the distance between the parts. For example, in the case of blades of compressors, in the case of a sealing strip of a labyrinth seal, etc.

| List of designations | |
|---|---|
| 1 | First layer |
| 2 | Second layer |
| 3 | Third layer |
| 10 | Gaseous medium |
| 11 | Detector |
| 12 | Analyzer |
| 20 | Turbine |
| 21 | Rotor |
| 22 | Moving blade |
| 23 | Casing |
| 24 | Guide blade |
| 25 | Duct |
| 26 | Exhaust-gas casing |
| 27 | Rotation axis, rotor |
| 29 | Blade-body tip |
| 30 | Gap distance 22 to 1 |
| D1 | Layer thickness 1 |
| D2 | Layer thickness 2 |
| D3 | Layer thickness 3 |

What is claimed is:

1. Arrangement for measuring a distance between rotating and stationary parts of a turbine, whereby the distance between the tip of rotating bodies, which are arranged on a rotor of the turbine, and an inside of a casing, which enclosed the rotating bodies, of the turbine is measured, comprising at least one abrasion-tolerant layer being arranged opposite a tip of the rotating body on the inside of the casing, characterized in that at least one indicator is embedded in the abrasion-tolerant layer, said indicator, when abraded together with the abrasion-tolerant layer, is transported in a fluid-flow of the turbine, and can be detected by a detector.

2. Arrangement according to claim 1, characterized in that various indicators are embedded in various layers, which follow one another in radial direction.

3. Arrangement according to claim 2, characterized in that the rotating body is a moving blade.

4. Arrangement according to claim 2, characterized in that the rotating body is a sealing strip of a labyrinth seal.

5. Arrangement according to claim 1, characterized in that various indicators are embedded in various layers, which are arranged in the case of various rows of rotating bodies in the direction of flow of a medium flowing through the turbine.

6. Arrangement according to claim 5, characterized in that the rotating body is a moving blade.

7. Arrangement according to claim 5, characterized in that the rotating body is a sealing strip of a labyrinth seal.

8. Arrangement according to claim 1, characterized in that the rotating body is a moving blade.

9. Arrangement according to claim 1, characterized in that the rotating body is a sealing strip of a labyrinth seal.

10. Method for measuring a distance between rotating and stationary parts of a turbine, the distance between a tip of rotating bodies, which are arranged on a rotor of the turbine, and an inside of a casing, which encloses the rotating body, of the turbine being measured, and at least one abrasion-tolerant layer being arranged opposite the tip of the rotating body on the inside of the casing, characterized in that the layers abraded by the rotating bodies during operation of the turbine are determined by means of an indicator embedded in the layer and by means of a detector lying downstream and an associated analyzer.

11. Method according to claim 10, characterized in that the measurement and determination of the abraded layers is effected in the transients of the turbine.

12. An arrangement for measuring a distance between a rotating part and a stationary part, the rotating part being positioned within a casing of the stationary part, the rotating part having a protruding portion arranged opposite an inside of the casing, the arrangement comprising:

at least one abrasion-tolerant layer configured to be provided on the inside of the casing opposite the protruding portion, said at least one abrasion-tolerant layer having at least one indicator, whereby a distance between the protruding portion and the inside of the casing is measured based upon detection of said at least one indicator in a fluid within the casing caused by contact between the protruding portion and said at least one abrasion-tolerant layer.

13. The arrangement according to claim 12, wherein a plurality of abrasion-tolerant layers are provided on the inside of the casing, each of said plurality of abrasion-tolerant layers having at least one indicator.

14. The arrangement according to claim 13, wherein said plurality of abrasion-tolerant layers are provided in a radially successive arrangement.

15. The arrangement according to claim 13, wherein said plurality of abrasion-tolerant layers are arranged in a direction of flow of a medium flowing through the inside of the casing.

16. The arrangement according to claim 13, wherein one of said plurality of abrasion-tolerant layers is provided with a plurality of indicators.

17. The arrangement according to claim 13, wherein each of said plurality of abrasion-tolerant layers is provided with at least one distinct indicator.

18. The arrangement according to claim 13, wherein the protruding portion of the rotating part is a moving blade of a turbine.

19. The arrangement according to claim 13, wherein the rotating part is a sealing strip of a labyrinth seal.

20. A method for measuring a distance between a rotating part and a stationary part, the rotating part being positioned within a casing of the stationary part, the rotating part having a protruding portion arranged opposite an inside of the casing, the method comprising the steps of:

providing at least one abrasion-tolerant layer on the inside of the casing opposite the protruding portion, the at least one abrasion-tolerant layer having at least one indicator; and measuring a distance between the protruding portion and the inside of the casing based upon detection of the at least one indicator in a fluid within the casing caused by contact between the protruding portion and the at least one abrasion-tolerant layer.

* * * * *